(12) United States Patent
Zhang et al.

(10) Patent No.: US 10,713,381 B2
(45) Date of Patent: **\*Jul. 14, 2020**

(54) METHOD AND APPARATUS FOR SECURELY CALLING FINGERPRINT INFORMATION, AND MOBILE TERMINAL

(71) Applicant: GUANGDONG OPPO MOBILE TELECOMMUNICATIONS CORP., LTD., Dongguan, Guangdong (CN)

(72) Inventors: Qiang Zhang, Guangdong (CN); Lizhong Wang, Guangdong (CN); Haitao Zhou, Guangdong (CN); Kui Jiang, Guangdong (CN); Wei He, Guangdong (CN)

(73) Assignee: GUANGDONG OPPO MOBILE TELECOMMUNICATIONS CORP., LTD., Dongguan, Guangdong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/248,694

(22) Filed: Jan. 15, 2019

(65) Prior Publication Data
US 2019/0156059 A1    May 23, 2019

Related U.S. Application Data (63) Continuation of application No. 15/759,512, filed as application No. PCT/CN2016/093743 on Aug. 5, 2016.

(30) Foreign Application Priority Data

Oct. 19, 2015 (CN) .......................... 2015 1 0681154

(51) Int. Cl.
*G06F 21/60* (2013.01)
*G06F 21/62* (2013.01)
(Continued)

(52) U.S. Cl.
CPC .......... *G06F 21/6245* (2013.01); *G06F 21/32* (2013.01); *G06F 21/44* (2013.01);
(Continued)

(58) Field of Classification Search
CPC .......... G06F 21/32; G06F 21/44; G06F 21/53; G06F 21/554; G06F 21/6245;
(Continued)

(56) References Cited

U.S. PATENT DOCUMENTS 6,721,891 B1    4/2004  Borza
8,863,252 B1   10/2014  Katzer et al.
(Continued)

FOREIGN PATENT DOCUMENTS

CN    101853357 A    10/2010
CN    102546172 A     7/2012
(Continued)

OTHER PUBLICATIONS

PCT/CN2016/093743 English translation of International Search Report dated Nov. 8, 2016, 2 pages.
(Continued)

*Primary Examiner* — Trang T Doan
(74) *Attorney, Agent, or Firm* — Lathrop GPM LLP (57) ABSTRACT

Provided are a method for securely calling fingerprint information, an apparatus for securely calling fingerprint information, and a mobile terminal. The method includes: receiving a request for calling the fingerprint information (S101); according to a unique identification in an application process sending the request for calling the fingerprint information, determining whether the application corresponding to the application process is a legitimate application (S102); when it is determined that the application corresponding to the application process is a legitimate application, allowing the
(Continued)

application corresponding to the application process to call the fingerprint information (S103).

15 Claims, 6 Drawing Sheets

(51) Int. Cl.

| | | |
|---|---|---|
| *G06F 21/32* | (2013.01) | |
| *G06F 21/74* | (2013.01) | |
| *G06F 21/72* | (2013.01) | |
| *H04W 12/10* | (2009.01) | |
| *G06F 21/53* | (2013.01) | |
| *H04W 12/00* | (2009.01) | |
| *G06F 21/44* | (2013.01) | |
| *G06F 21/55* | (2013.01) | |

(52) U.S. Cl.
CPC ............ *G06F 21/53* (2013.01); *G06F 21/554* (2013.01); *G06F 21/72* (2013.01); *G06F 21/74* (2013.01); *H04W 12/002* (2019.01); *H04W 12/0023* (2019.01); *H04W 12/10* (2013.01); *G06F 2221/033* (2013.01); *G06F 2221/2123* (2013.01)

(58) Field of Classification Search
CPC .... G06F 21/72; G06F 21/74; G06F 2221/033; G06F 2221/2123; H04W 12/002; H04W 12/0023; H04W 12/10
See application file for complete search history.

(56) References Cited

U.S. PATENT DOCUMENTS

| | | | |
|---|---|---|---|
| 2005/0138397 A1 | 6/2005 | Kusudo et al. | |
| 2009/0067689 A1 | 3/2009 | Porter et al. | |
| 2010/0042848 A1 | 2/2010 | Rosener | |
| 2010/0325734 A1 | 12/2010 | Etchegoyen | |
| 2011/0225417 A1 | 9/2011 | Maharajh et al. | |
| 2013/0036309 A1 | 2/2013 | Kevenaar et al. | |
| 2013/0318625 A1* | 11/2013 | Fan ........................ | G06F 21/62 726/27 |
| 2015/0222641 A1 | 8/2015 | Lu et al. | |
| 2015/0262067 A1 | 9/2015 | Sridhara et al. | |
| 2016/0125240 A1 | 5/2016 | Danikhno et al. | |
| 2016/0364559 A1 | 12/2016 | Bali et al. | |
| 2016/0366119 A1 | 12/2016 | Rykowski et al. | |
| 2017/0061441 A1* | 3/2017 | Kamal ............. | G06Q 20/40145 |

FOREIGN PATENT DOCUMENTS

| | | |
|---|---|---|
| CN | 103378971 A | 10/2013 |
| CN | 104021351 A | 9/2014 |
| CN | 104219052 A | 12/2014 |
| CN | 104283678 A | 1/2015 |
| CN | 104598793 A | 5/2015 |
| CN | 104778393 A | 7/2015 |
| CN | 105243311 A | 1/2016 |
| EP | 2911076 A1 | 8/2015 |
| WO | WO 2015117523 A1 | 8/2015 |

OTHER PUBLICATIONS

PCT/CN2016/093743 International Search Report and Written Opinion dated Nov. 8, 2016, 13 pages.
European Patent Application No. 16856719.6 Office Action dated Dec. 18, 2018, 5 pages.
European Patent Application No. 16856719.6 extended Search and Opinion dated May 30, 2018, 6 pages.
Chinese Patent Application No. 201510681154.6 First Office Action dated Jun. 27, 2016, 5 pages.
Chinese Patent Application No. 201510681154.6 English translation of First Office Action dated Jun. 27, 2016, 5 pages.
Chinese Patent Application No. 201510681154.6 First Search dated Jun. 27, 2016, 1 page.
Chinese Patent Application No. 201510681154.6 Supplementary Search dated Nov. 2, 2016, 1 page.
Chinese Patent Application No. 201510681154.6 Notification to Grant Patent dated Jan. 11, 2017, 2 pages.
Chinese Patent Application No. 201510681154.6 English translation of Notification to Grant Patent dated Jan. 11, 2017, 2 pages.
Chinese Patent Application No. 201510681154.6 English translation of allowed claims as of Jan. 1, 2017, 3 pages.
Chinese Patent Application No. 201510681154.6 allowed claims as of Jan. 1, 2017, 2 pages.
U.S. Appl. No. 15/759,512 Office Action dated Sep. 6, 2019, 17 pages.

* cited by examiner

METHOD AND APPARATUS FOR SECURELY CALLING FINGERPRINT INFORMATION, AND MOBILE TERMINAL

CROSS-REFERENCE TO RELATED APPLICATION

This application is a continuation application of U.S. patent application Ser. No. 15/759,512, filed Mar. 12, 2018, which is a National phase application of International Application No. PCT/CN2016/093743, filed on Aug. 5, 2016, which claims priority to and benefits of Chinese Patent Application No. 201510681154.6, filed with the State Intellectual Property Office of P. R. China on Oct. 19, 2015, and titled with "method and apparatus for securely calling fingerprint information, and mobile terminal". The entire content of each of the applications is incorporated herein by reference.

FIELD

Embodiments of the present disclosure relate to fingerprint recognition technologies, and more particularly to, a method for securely calling fingerprint information, an apparatus for securely calling fingerprint information and a mobile terminal.

BACKGROUND

Since the fingerprint is characteristic of uniqueness, immutability and difficulty to copy, a fingerprint-based authentication has high security performance and is suitable for applications requiring high security such as unlocking and payment.

In the process of using fingerprint recognition to authenticate, an application to be authenticated needs to perform data interactions with a corresponding fingerprint verification application, and then compares the obtained fingerprint information with preset fingerprint information, to determine whether the obtained fingerprint information is consistent with the preset fingerprint information. The application can obtain the fingerprint information during the interactions. Some illegitimate applications can use this to access the fingerprint information through a corresponding operating rule and a call function. In this way, the fingerprint information of users is leaked out, such that the security of user information is threatened.

SUMMARY

Embodiments of the present disclosure provide a method for securely calling fingerprint information, an apparatus for securely calling fingerprint information and a mobile terminal.

Embodiments of the present disclosure provide a method for securely calling fingerprint information. The method includes: receiving a request for calling the fingerprint information; determining whether an application corresponding to an application process sending the request for calling the fingerprint information is a legitimate application according to a first unique identification in the application process; and allowing the application corresponding to the application process to call the fingerprint information when it is determined that the application corresponding to the application process is the legitimate application.

Embodiments of the present disclosure provide an apparatus for securely calling fingerprint information. The apparatus includes: a request receiving module, configured to receive a request for calling the fingerprint information; a legitimate application determining module, configured to determine whether an application corresponding to an application process sending the request for calling the fingerprint information is a legitimate application according to a first unique identification in the application process; and a call allowing module, configured to allow the application corresponding to the application process to call the fingerprint information when it is determined that the application corresponding to the application process is the legitimate application.

Embodiments of the present disclosure provide a mobile terminal. The mobile terminal includes a fingerprint sensor and an apparatus for securely calling fingerprint information coupled to the fingerprint sensor. The apparatus for securely calling fingerprint information includes: a request receiving module, configured to receive a request for calling the fingerprint information; a legitimate application determining module, configured to determine whether an application corresponding to an application process sending the request for calling the fingerprint information is a legitimate application according to a first unique identification in the application process; and a call allowing module, configured to allow the application corresponding to the application process to call the fingerprint information when it is determined that the application corresponding to the application process is the legitimate application.

BRIEF DESCRIPTION OF THE DRAWINGS

Other features, objectives and advantages of the present disclosure will become more apparent upon reading detailed descriptions of the non-limiting embodiments made with reference to the following drawings, in which.

DETAILED DESCRIPTION

The present disclosure will be described in detail below with reference to the accompanying drawings and the embodiments. It should be understood that, the specific embodiments described herein are only used to explain the present disclosure rather than to limit the present disclosure. In addition, it should also be noted that, for convenience of description, only part but not all structures related to the present disclosure are illustrated in the accompanying drawings.

Embodiments of the present disclosure provide a method for securely calling fingerprint information. The method includes: receiving a request for calling the fingerprint information; determining whether an application corresponding to an application process sending the request for calling the fingerprint information is a legitimate application according to a first unique identification in the application process; and allowing the application corresponding to the application process to call the fingerprint information when it is determined that the application corresponding to the application process is the legitimate application.

In an embodiment, the method further includes: when it is determined that the application corresponding to the application process is an illegitimate application, forbidding the application corresponding to the application process to call the fingerprint information, and outputting a warning message.

In an embodiment, before receiving the request for calling the fingerprint information, the method further includes: generating a second unique identification of the application according to a unique identification public key of the application when installing the application, and storing the second unique identification.

Determining whether the application corresponding to the application process is the legitimate application according to the first unique identification in the application process sending the request for calling the fingerprint information includes: matching the first unique identification in the application process sending the request for calling the fingerprint information with the second unique identification, and determining that the application corresponding to the application process is the legitimate application when the first unique identification in the application process is matched with the second unique identification successfully.

In an embodiment, storing the second unique identification includes: storing the second unique identification in an application based on a TrustZone environment, and administrator rights being required run the application based on the TrustZone environment.

Matching the first unique identification in the application process sending the request for calling the fingerprint information with the second unique identification includes: accessing the application based on the TrustZone environment, and matching the first unique identification in the application process sending the request for calling the fingerprint information with the second unique identification stored in the application based on the TrustZone environment.

In an embodiment, accessing the application based on the TrustZone environment, and matching the first unique identification in the application process sending the request for calling the fingerprint information with the second unique identification stored in the application based on the TrustZone environment includes: obtaining the second unique identification by accessing the application based on the TrustZone environment; determining whether the second unique identification is same as the first unique identification in the application process sending the request for calling the fingerprint information; determining that the first unique identification in the application process is matched with the second unique identification successfully when the second unique identification is the same as the first unique identification in the application process; and determining that the first unique identification in the application process fails to match with the second unique identification when the second unique identification is different from the first unique identification in the application process.

In an embodiment, after determining that the application corresponding to the application process is the legitimate application, and before allowing the application corresponding to the application process to call the fingerprint information, the method further includes: confusing the first unique identification in the application process with an instruction for calling the fingerprint information sent by the application corresponding to the application process, to generate a confusion instruction.

Allowing the application to call the fingerprint information includes: extracting the first unique identification from the confusion instruction, matching the first unique identification with the second unique identification, allowing the application corresponding to the application process to call the fingerprint information when the first unique identification is matched with the second unique identification successfully.

In an embodiment, confusing the first unique identification in the application process with the instruction for calling the fingerprint information sent by the application corresponding to the application process, to generate the confusion instruction includes: adding the first unique identification in the application process to the instruction for calling the fingerprint information sent by the application corresponding to the application process according to a preset location, to generate the confusion instruction.

Accordingly, embodiments of the present disclosure provide an apparatus for securely calling fingerprint information. The apparatus includes: a request receiving module, configured to receive a request for calling the fingerprint information; a legitimate application determining module, configured to determine whether an application corresponding to an application process sending the request for calling the fingerprint information is a legitimate application according to a first unique identification in the application process sending the request for calling the fingerprint information; and a call allowing module, configured to allow the application corresponding to the application process to call the fingerprint information when it is determined that the application corresponding to the application process is the legitimate application.

In an embodiment, the apparatus further includes a warning message outputting module. The warning message outputting module is configured to forbid the application corresponding to the application process to call the fingerprint information, and output a warning message when it is determined that the application corresponding to the application process is an illegitimate application.

In an embodiment, the apparatus further includes an identification generating module and an identification storing module. The identification generating module is configured to generate a second unique identification of the application according to a unique identification public key of the application when installing the application. The identification storing module is configured to store the second unique identification.

The legitimate application determining module includes an identification matching unit. The identification matching unit is configured to match the first unique identification in the application process sending the request for calling the fingerprint information with the second unique identification, and determine that the application corresponding to the application process is the legitimate application when the first unique identification in the application process is matched with the second unique identification successfully.

In an embodiment, the identification storing module is configured to store the second unique identification in an application based on a TrustZone environment. Administrator rights are required to run the application based on the TrustZone environment.

The identification matching unit is configured to access the application based on the TrustZone environment, and match the first unique identification in the application process sending the request for calling the fingerprint information with the second unique identification stored in the application based on the TrustZone environment.

In an embodiment, the identification matching unit is further configured to: obtain the second unique identification by accessing the application based on the TrustZone environment; determine whether the second unique identification is same as the first unique identification in the application process sending the request for calling the fingerprint information; determine that the first unique identification in the application process is matched with the second unique identification successfully when the second unique identification is the same as the first unique identification in the application process; and determine that the first unique identification in the application process fails to match with the second unique identification when the second unique identification is different from the first unique identification in the application process.

In an embodiment, the apparatus further includes a confusion instruction generating module. The confusion instruction generating module is configured to confuse the first unique identification in the application process with an instruction for calling the fingerprint information sent by the application corresponding to the application process, to generate a confusion instruction.

The identification matching unit is configured to extract the first unique identification from the confusion instruction, match the first unique identification with the second unique identification, and allow the application corresponding to the application process to call the fingerprint information when the first unique identification is matched with the second unique identification successfully.

In an embodiment, the confusion instruction generating module is further configured to add the first unique identification in the application process to the instruction for calling the fingerprint information sent by the application corresponding to the application process according to a preset location, to generate the confusion instruction.

Accordingly, embodiments of the present disclosure further provide a mobile terminal. The mobile terminal includes a fingerprint sensor and an apparatus for securely calling fingerprint information coupled to the fingerprint sensor. The apparatus for securely calling fingerprint information includes: a request receiving module, configured to receive a request for calling the fingerprint information; a legitimate application determining module, configured to determine whether an application corresponding to an application process sending the request for calling the fingerprint information is a legitimate application according to a first unique identification in the application process sending the request for calling the fingerprint information; and a call allowing module, configured to allow the application corresponding to the application process to call the fingerprint information when it is determined that the application corresponding to the application process is the legitimate application.

In an embodiment, the apparatus for securely calling fingerprint information further includes a warning message outputting module. The warning message outputting module is configured to forbid the application corresponding to the application process to call the fingerprint information, and output a warning message when it is determined that the application corresponding to the application process is an illegitimate application.

In an embodiment, the apparatus for securely calling fingerprint information further includes an identification generating module and an identification storing module. The identification generating module is configured to generate a second unique identification of the application according to a unique identification public key of the application when installing the application. The identification storing module is configured to store the second unique identification.

The legitimate application determining module includes an identification matching unit. The identification matching unit is configured to match the first unique identification in the application process sending the request for calling the fingerprint information with the second unique identification, and determine that the application corresponding to the application process is the legitimate application when the first unique identification in the application process is matched with the second unique identification successfully.

In an embodiment, the identification storing module is configured to store the second unique identification in an application based on a TrustZone environment. Administrator rights are required to run the application based on the TrustZone environment.

The identification matching unit is configured to access the application based on the TrustZone environment, and match the first unique identification in the application process sending the request for calling the fingerprint information with the second unique identification stored in the application based on the TrustZone environment.

In an embodiment, the identification matching unit is further configured to: obtain the second unique identification by accessing the application based on the TrustZone environment; determine whether the second unique identification is same as the first unique identification in the application process sending the request for calling the fingerprint information; determine that the first unique identification in the application process is matched with the second unique identification successfully when the second unique identification is the same as the first unique identification in the application process; and determine that the first unique identification in the application process fails to match with the second unique identification when the second unique identification is different from the first unique identification in the application process.

In an embodiment, the apparatus for securely calling fingerprint information further includes a confusion instruction generating module. The confusion instruction generating module is configured to confuse the first unique identification in the application process with an instruction for calling the fingerprint information sent by the application corresponding to the application process, to generate a confusion instruction.

The identification matching unit is configured to extract the first unique identification from the confusion instruction, match the first unique identification with the second unique identification, and allow the application corresponding to the application process to call the fingerprint information when the first unique identification is matched with the second unique identification successfully.

Figure 1:
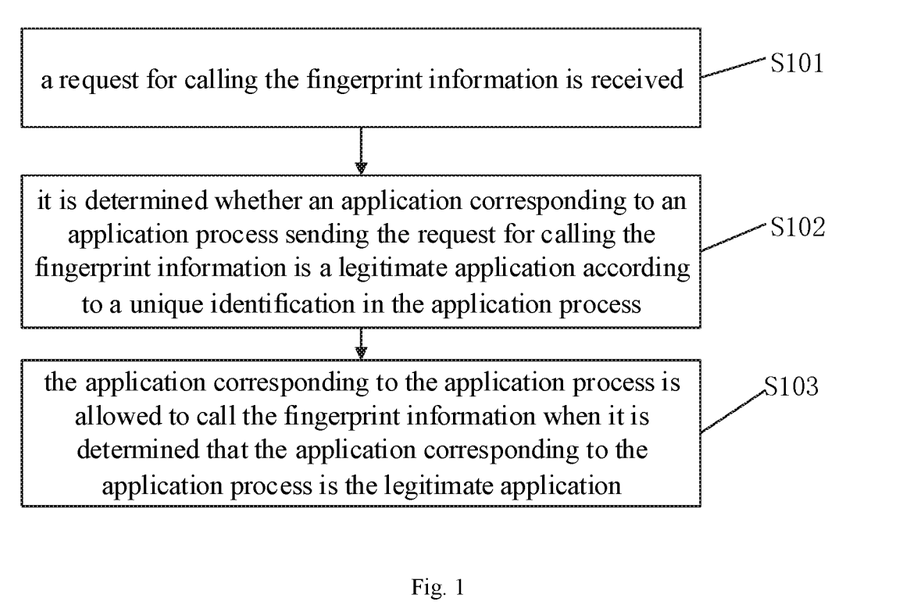
FIG. 1 is a flow chart of a method for securely calling fingerprint information according to a first embodiment of the present disclosure.

FIG. 1 illustrates a first embodiment of the present disclosure.

FIG. 1 is a flow chart of a method for securely calling fingerprint information according to the first embodiment of the present disclosure. The method in this embodiment may be performed by an apparatus for securely calling fingerprint information. The apparatus may be implemented by hardware and/or software, and may generally be integrated in a mobile terminal.

Referring to FIG. 1, the method for securely calling fingerprint information includes the following.

At block S101, a request for calling the fingerprint information is received.

When the application needs to use the fingerprint information, the application will send a request to a terminal system to call the fingerprint information. The request is configured to call a lower software interface, i.e., a channel with which the application accesses data resources. After the terminal system receives the request for calling the fingerprint information, the terminal system interacts with the application, such that the application obtains the fingerprint information.

At block S102, it is determined whether an application corresponding to an application process sending the request for calling the fingerprint information is a legitimate application according to a unique identification in the application process.

In Android system, each application has a unique identification Uid. By default, the Android system may assign a unique identification Uid with distinct normal level based on a signature certificate of each application. Since there is only one unique identification Uid for the same application, by using the unique identification Uid of the application, it can be determined whether the application is the legitimate application which is allowed to call the fingerprint information. In detail, process information of the application can be obtained. An application name in process information of a non-system application is started with "app", and appended with a serial number. The unique identification Uid in the application process can be obtained according to the serial number, and it can be determined whether the application corresponding to the application process is the legitimate application which is allowed to call the fingerprint information according to the unique identification Uid.

At block S103, the application corresponding to the application process is allowed to call the fingerprint information when it is determined that the application corresponding to the application process is the legitimate application.

According to a judgment result at block S102, it is possible to determine whether the application corresponding to the application process sending the request for calling the fingerprint information is the legitimate application. When it is determined that the application corresponding to the application process sending the request for calling the fingerprint information is the legitimate application, the application corresponding to the application process is allowed to call the fingerprint information.

In this embodiment, it is able to determine whether the application corresponding to the application process is the legitimate application according to the unique identification of the application sending the request for calling the fingerprint information, and refuse a request of the illegitimate application for accessing the fingerprint information, such that the security level of the fingerprint information is improved, and the security of user fingerprint information is ensured.

In an embodiment of the present disclosure, the method further includes: when it is determined that the application corresponding to the application process is an illegitimate application, forbidding the application corresponding to the application process to call the fingerprint information, and outputting a warning message. When it is determined that the application corresponding to the application process is the illegitimate application, the application corresponding to the application process is forbidden from calling the fingerprint information, to prevent the illegitimate application from accessing the fingerprint information. In addition, a corresponding warning message will be sent to the user, to prompt the user that the illegitimate application attempts to access the fingerprint information, so that the user can process the illegitimate application according to the warning message, to ensure security of personal information of the user.

Figure 2:
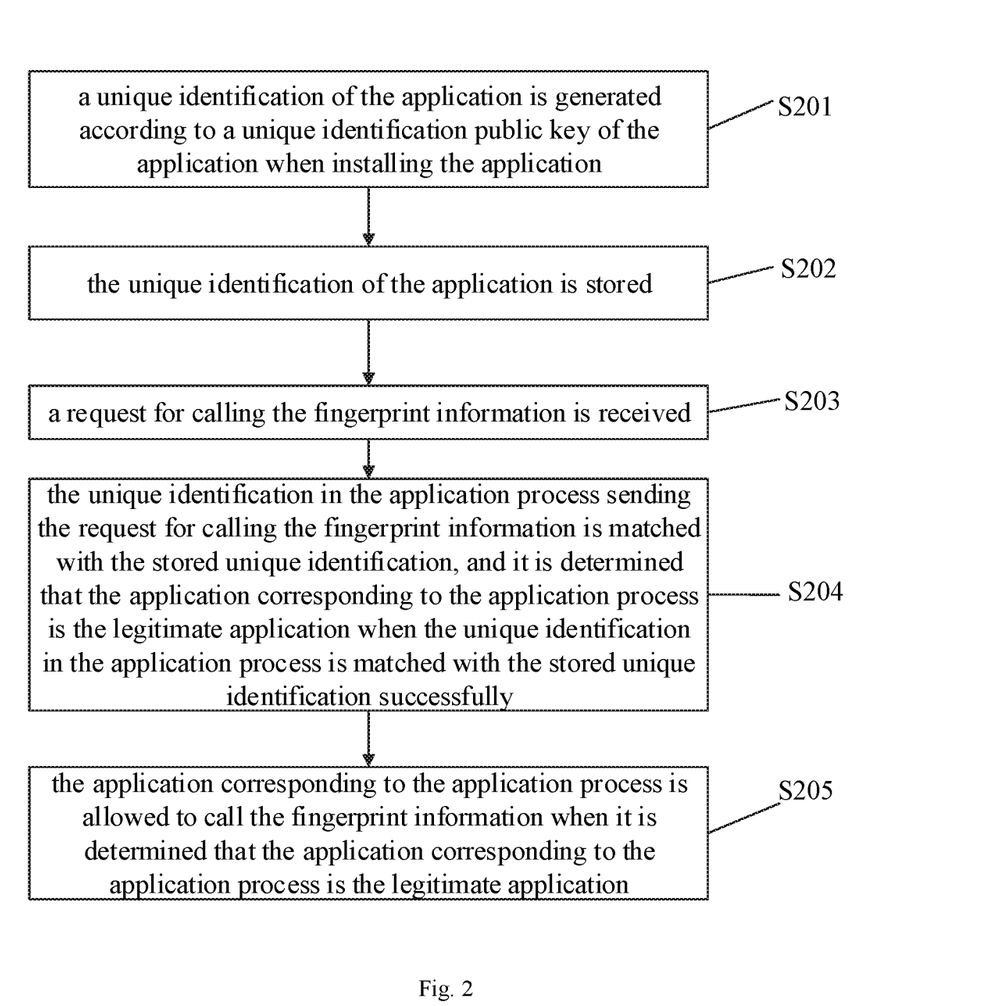
FIG. 2 is a flow chart of a method for securely calling fingerprint information according to a second embodiment of the present disclosure.

FIG. 2 illustrates a second embodiment of the present disclosure.

This embodiment is based on the method for securely calling fingerprint information provided by the first embodiment of the present disclosure. In addition, before the request for calling the fingerprint information is received, the following steps are introduced: generating a unique identification of the application according to a unique identification public key of the application when installing the application, and storing the unique identification of the application. Determining whether the application corresponding to the application process is the legitimate application according to the unique identification in the application process sending the request for calling the fingerprint information is optimized as: matching the unique identification in the application process sending the request for calling the fingerprint information with the stored unique identification, and determining that the application corresponding to the application process is the legitimate application when the matching is successful.

Referring to FIG. 2, the method for securely calling fingerprint information includes the following.

At block S201, a unique identification of the application is generated according to a unique identification public key of the application when installing the application.

The legitimate application requires official authorization, such as official authorization from Android developer Google, mobile phone manufacturers, or the like. The application is digitally signed with the unique identification public key obtained through the official authorization, to indicate legitimacy and security of the application. The digital signature can be permanently combined with signed information, and cannot be removed from the information. Since the public key is uniquely identified, the unique identification Uid of the application can be generated according to the unique identification public key of the application when the application is installed.

At block S202, the unique identification of the application is stored.

In detail, the unique identification Uid generated at block S201 may be stored, and the unique identification Uid is stored in a storage area that is safe and cannot be accessed arbitrarily.

At block S203, a request for calling the fingerprint information is received.

At block S204, the unique identification in the application process sending the request for calling the fingerprint information is matched with the stored unique identification, and it is determined that the application corresponding to the application process is the legitimate application when the unique identification in the application process is matched with the stored unique identification successfully.

The unique identification Uid of the application sending the request for calling the fingerprint information is obtained using the process information, and the obtained unique identification Uid is matched with the Uid stored at block S202. When the matching is successful, it is determined that the application sending the request for calling the fingerprint information is the legitimate application.

At block S205, the application corresponding to the application process is allowed to call the fingerprint information when it is determined that the application corresponding to the application process is the legitimate application.

In the embodiment, before the request for calling the fingerprint information is received, the following steps are introduced: generating the unique identification of the application according to a unique identification public key of the application when installing the application, and storing the unique identification of the application. Determining whether the application corresponding to the application process is the legitimate application according to the unique identification in the application process sending the request for calling the fingerprint information is optimized as: matching the unique identification in the application process sending the request for calling the fingerprint information with the stored unique identification, and determining that the application corresponding to the application process is the legitimate application when the matching is successful. In this way, it is able to use a digital signature mechanism to determine whether the application that calls the fingerprint information is a legitimate authorized application, such that the security of the user fingerprint information is ensured.

Figure 3:
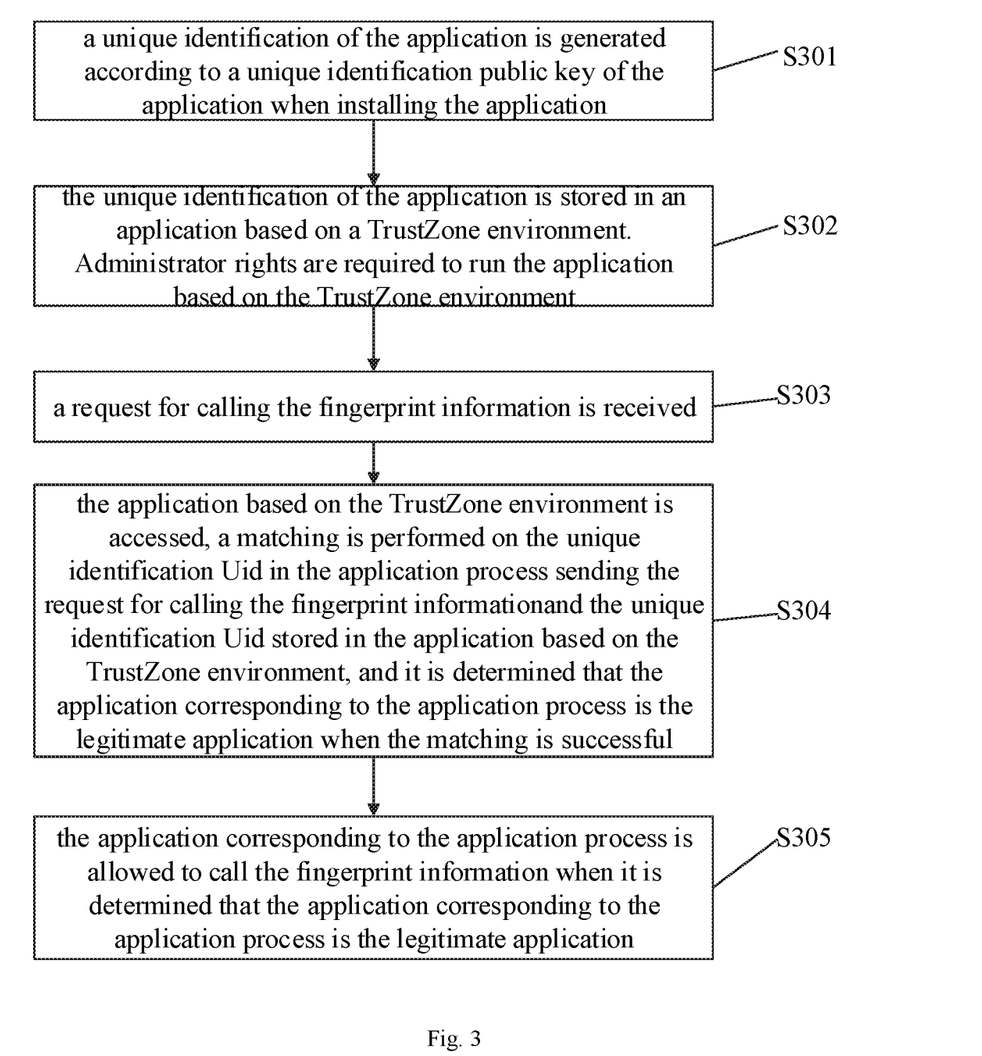
FIG. 3 is a flow chart of a method for securely calling fingerprint information according to a third embodiment of the present disclosure.

FIG. 3 illustrates a third embodiment of the present disclosure.

This embodiment is based on the method for securely calling fingerprint information provided by the second embodiment of the present disclosure. In addition, storing the unique identification of the application is optimized as: storing the unique identification in an application based on a TrustZone environment. Administrator rights are required to run the application based on the TrustZone environment. Matching the unique identification in the application process sending the request for calling the fingerprint information with the stored unique identification is optimized as: accessing the application based on the TrustZone environment, and matching the unique identification in the application process sending the request for calling the fingerprint information with the unique identification stored in the application based on the TrustZone environment.

Referring to FIG. 3, the method for securely calling fingerprint information includes the following.

At block S301, a unique identification of the application is generated according to a unique identification public key of the application when installing the application.

At block S302, the unique identification of the application is stored in an application based on a TrustZone environment. Administrator rights are required to run the application based on the TrustZone environment.

Since the stored unique identification Uid may be obtained by other applications in various ways, the illegitimate application may be disguised as the legitimate application through the obtained unique identification Uid. In order to avoid this situation, in this embodiment, the unique identification Uid of the application generated at block S301 is stored in the application based on the TrustZone environment. The TrustZone is a security architecture that aims to protect devices against various security threats, which is mainly implemented by dividing hardware and software into two zones. The two zones include a security zone and a normal zone. Normal software can only access the normal zone, and specific security software can access the security zone and the normal zone. By storing the unique identification Uid in the application based on the TrustZone environment, the unique identification Uid cannot be obtained by other applications. The administrator rights (i.e., root rights) are required to run the application based on the TrustZone environment. The unique identification Uid of the application stored in the application based on the TrustZone environment cannot be arbitrarily obtained by other applications.

At block S303, a request for calling the fingerprint information is received.

At block S304, the application based on the TrustZone environment is accessed, a matching is performed on the unique identification Uid in the application process sending the request for calling the fingerprint information and the unique identification Uid stored in the application based on the TrustZone environment, and it is determined that the application corresponding to the application process is the legitimate application when the matching is successful.

After the administrator rights are obtained, the system accesses the application based on the TrustZone environment, and obtains the stored unique identification Uid through the application based on the TrustZone environment. The unique identification Uid in the application process sending the request for calling the fingerprint information is compared with the obtained unique identification Uid stored at block S302, to determine whether they are the same. When they are the same, it is determined that the matching is successful. When they are different, it is determined that the matching is failed. When the matching is successful, it is determined that the application corresponding to the application process sending the request for calling the fingerprint information is the legitimate application. That is, accessing the application based on the TrustZone environment, and matching the unique identification Uid in the application process sending the request for calling the fingerprint information with the unique identification Uid stored in the application based on the TrustZone environment is optimized as: obtaining the stored unique identification by accessing the application based on the TrustZone environment; determining whether the stored unique identification is the same as the unique identification in the application process sending the request for calling the fingerprint information; determining that the matching is successful when they are the same; and determining that the matching is failed when they are different. At block S305, the application corresponding to the application process is allowed to call the fingerprint information when it is determined that the application corresponding to the application process is the legitimate application.

In the embodiment, storing the unique identification of the application is optimized as: storing the unique identification in an application based on a TrustZone environment. Administrator rights are required to run the application based on the TrustZone environment. And, matching the unique identification in the application process sending the request for calling the fingerprint information with the stored unique identification is optimized as: accessing the application based on the TrustZone environment, and matching the unique identification Uid in the application process sending the request for calling the fingerprint information with the unique identification Uid stored in the application based on the TrustZone environment. In this way, the generated unique identification Uid can be stored in the application based on the TrustZone environment, thereby preventing the generated unique identification Uid from being embezzled and thus avoiding leakage of the fingerprint information.

Figure 4:
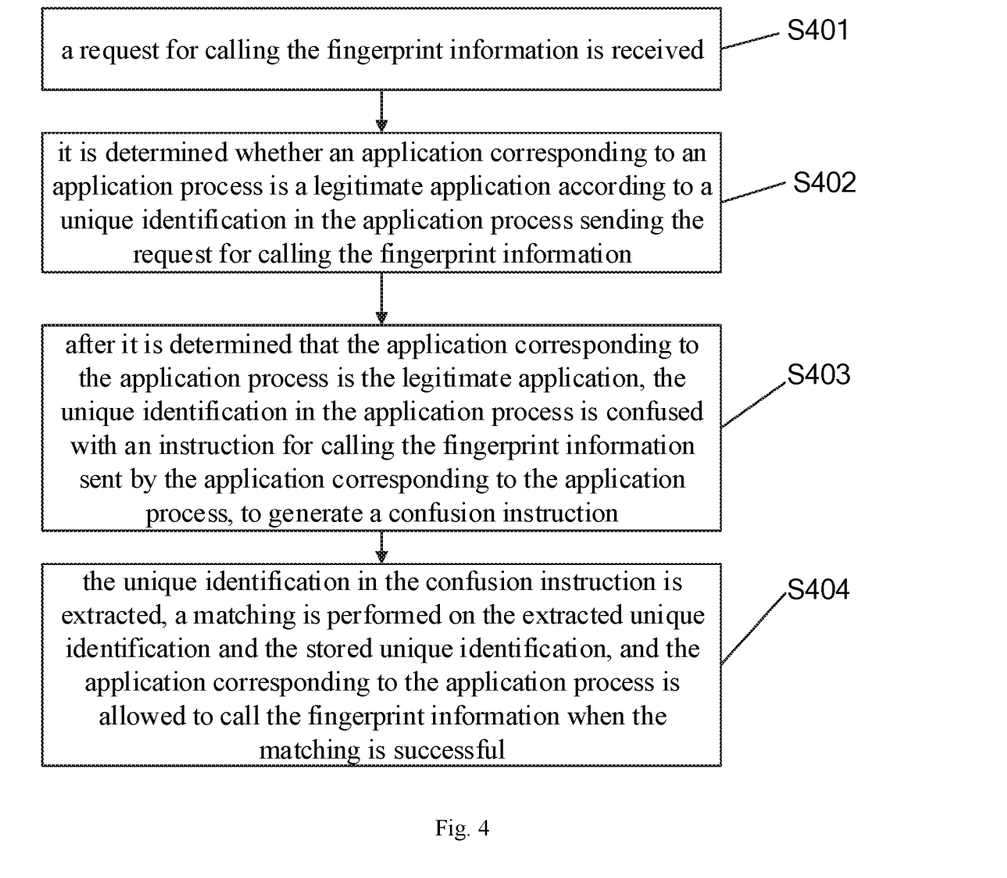
FIG. 4 is a flow chart of a method for securely calling fingerprint information according to a fourth embodiment of the present disclosure.

FIG. 4 illustrates a fourth embodiment of the present disclosure.

This embodiment is based on the method for securely calling fingerprint information provided by the first embodiment of the present disclosure. In addition, after it is determined that the application corresponding to the application process is the legitimate application, and before the application corresponding to the application process is allowed to call the fingerprint information, following steps are introduced: confusing the unique identification in the application process with an instruction for calling the fingerprint information sent by the application corresponding to the application process, to generate a confusion instruction. And, allowing the application to call the fingerprint information is optimized as: extracting the unique identification from the confusion instruction, matching the extracted unique identification with the stored unique identification, and allowing the application corresponding to the application process to call the fingerprint information when the matching is successful.

Referring to FIG. 4, the method for securely calling fingerprint information includes the following.

At block S401, a request for calling the fingerprint information is received.

At block S402, it is determined whether an application corresponding to an application process is a legitimate application according to a unique identification in the application process sending the request for calling the fingerprint information.

At block S403, after it is determined that the application corresponding to the application process is the legitimate application, the unique identification in the application process is confused with an instruction for calling the fingerprint information sent by the application corresponding to the application process, to generate a confusion instruction.

Some malicious applications do not run as services or threads. Instead, the malicious application generates and obtains a thread that can be injected into an address space of the application, and operates the private address space of other applications by using a dynamic embedded technology, so as to obtain data of the application. When the malicious application is injected into the legitimate application that can call the fingerprint information, since the malicious application is not displayed as a process, but embedded in the process of the legitimate application, it cannot prevent the malicious application from obtaining the fingerprint information using the unique identification Uid.

In order to prevent the fingerprint information from being obtained by the malicious application, in this embodiment, after it is determined that the application is the legitimate application according to the unique identification Uid in the application process sending the request for calling the fingerprint information, the unique identification Uid in the application process is confused with the instruction for calling the fingerprint information sent by the application to generate the confusion instruction. The instruction for calling the fingerprint information sent by the application is the request for calling the fingerprint information at block S401.

For example, the unique identification Uid in the application process is added in the instruction for calling the fingerprint information sent by the application at a preset location. For example, a first bit of the unique identification Uid is added to the instruction at the third character position, a second bit of the unique identification Uid is added to the instruction at the seventh character position. In this way, the unique identification Uid in the application process is added to the instruction for calling the fingerprint information sent by the application according to the preset location, and the added instruction is taken as the confusion instruction. In summary, confusing the unique identification in the application process with the instruction for calling the fingerprint information sent by the application corresponding to the application process to generate the confusion instruction is optimized as: adding the unique identification in the application process to the instruction for calling the fingerprint information sent by the application corresponding to the application process according to the preset location, to generate the confusion instruction.

At block S404, the unique identification in the confusion instruction is extracted, a matching is performed on the extracted unique identification and the stored unique identification, and the application corresponding to the application process is allowed to call the fingerprint information when the matching is successful.

The unique identification Uid is extracted from the confusion instruction according to a preset rule. For example, the first bit of the unique identification Uid is extracted from the confusion instruction at the third character position, and the second bit of the unique identification Uid is extracted from the confusion instruction at the seventh character position. In this way, the unique identification Uid is extracted from the confusion instruction, and the matching is performed on the extracted unique identification Uid and the stored unique identification Uid. Since the injected malicious application uses the dynamic embedded technology to operate the private address space of the legitimate application, the injected instruction is not the instruction for calling the fingerprint information sent by the legitimate application and is not confused using the way at block S401. The instruction for calling the fingerprint information from the injected malicious application does not include the unique identification Uid. By matching the extracted unique identification Uid with the stored unique identification Uid, it is able to determine whether the instruction for calling the fingerprint information is sent by the legitimate application or injected by the malicious application, and the application is allowed to call the fingerprint information only when the matching is successful.

In the embodiment, after it is determined that the application is the legitimate application, and before the application is allowed to call the fingerprint information, the following steps are introduced: confusing the unique identification in the application process with the instruction for calling the fingerprint information sent by the application, to generate the confusion instruction, and, allowing the application to call the fingerprint information is optimized as: extracting the unique identification from the confusion instruction, matching the extracted unique identification with the stored unique identification, and allowing the application corresponding to the application process to call the fingerprint information when the matching is successful. In this way, it is able to prevent the fingerprinting information from being obtained by the malicious application injected into the legitimate application, thereby further improving the security of the fingerprint information.

Figure 5:
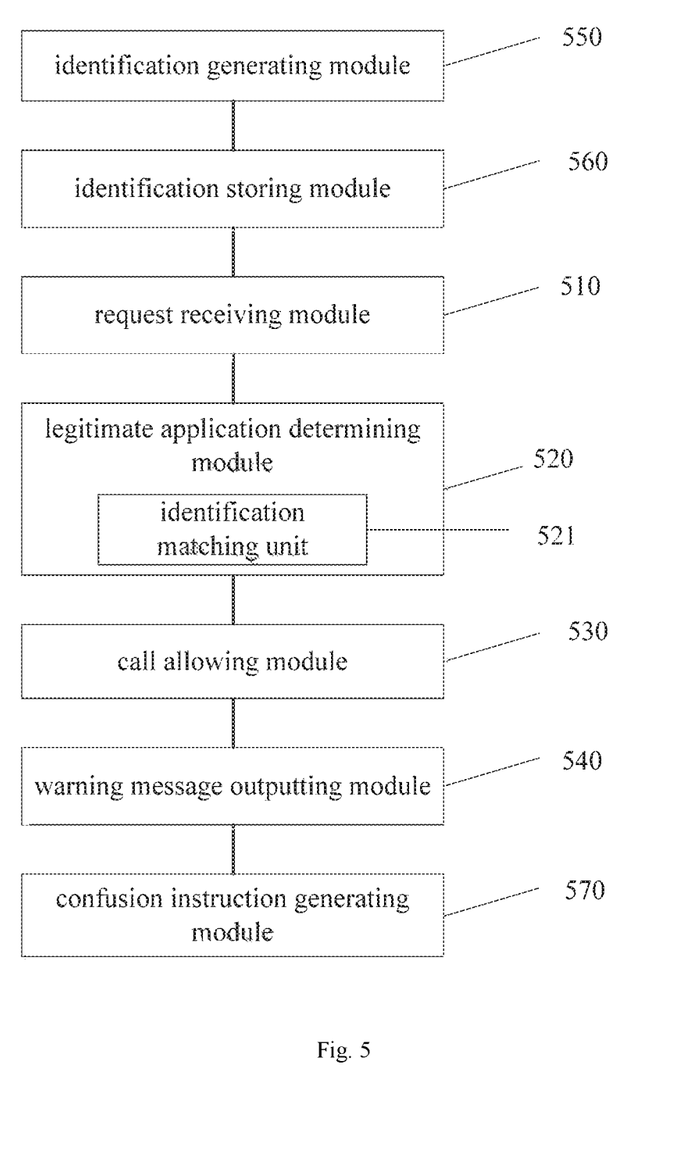
FIG. 5 is a block diagram of an apparatus for securely calling fingerprint information according to a fifth embodiment of the present disclosure.

FIG. 5 is a block diagram of an apparatus for securely calling fingerprint information according to a fifth embodiment of the present disclosure.

Referring to FIG. 5, the apparatus for securely calling fingerprint information includes a request receiving module 510, a legitimate application determining module 520 and a call allowing module 530.

The request receiving module 510 is configured to receive a request for calling the fingerprint information.

The legitimate application determining module 520 is configured to determine whether an application corresponding to an application process sending the request for calling the fingerprint information is a legitimate application according to a first unique identification in the application process.

The call allowing module 530 is configured to allow the application corresponding to the application process to call the fingerprint information when it is determined that the application corresponding to the application process is the legitimate application.

In the embodiment, it is able to determine whether the application is the legitimate application according to the unique identification of the application sending the request for calling the fingerprint information, and refuse a request of the illegitimate application for accessing the fingerprint information, such that the security level of the fingerprint information is improved, and the security of the user fingerprint information is ensured.

In addition, the apparatus further includes a warning message outputting module 540.

The warning message outputting module 540 is configured to forbid the application corresponding to the application process to call the fingerprint information, and output a warning message when it is determined that the application corresponding to the application process is an illegitimate application.

In addition, the apparatus further includes an identification generating module 550 and an identification storing module 560.

The identification generating module 550 is configured to generate a second unique identification of the application according to a unique identification public key of the application when installing the application.

The identification storing module 560 is configured to store the second unique identification.

The legitimate application determining module 520 includes an identification matching unit 521. The identification matching unit 521 is configured to match the first unique identification in the application process with the second unique identification, and determine that the application corresponding to the application process is the legitimate application when the first unique identification in the application process is matched with the second unique identification successfully.

In addition, the identification storing module 560 is configured to store the second unique identification in an application based on a TrustZone environment. Administrator rights are required to run the application based on the TrustZone environment.

The identification matching unit 521 is configured to access the application based on the TrustZone environment, and match the first unique identification in the application process with the second unique identification stored in the application based on the TrustZone environment.

In addition, the identification matching unit 521 is further configured to: obtain the second unique identification by accessing the application based on the TrustZone environment; determine whether the second unique identification is same as the first unique identification in the application process; determine that the first unique identification in the application process is matched with the second unique identification successfully when the second unique identification is the same as the first unique identification in the application process; and determine that the first unique identification in the application process fails to match with the second unique identification when the second unique identification is different from the first unique identification in the application process.

In addition, the apparatus further includes a confusion instruction generating module 570.

The confusion instruction generating module 570 is configured to confuse the first unique identification in the application process with an instruction for calling the fingerprint information sent by the application corresponding to the application process, to generate a confusion instruction.

The identification matching unit 521 is configured to extract the first unique identification from the confusion instruction, match the first unique identification with the second unique identification, and allow the application corresponding to the application process to call the fingerprint information when the first unique identification is matched with the second unique identification successfully.

In addition, the confusion instruction generating module 570 is further configured to add the first unique identification in the application process to the instruction for calling the fingerprint information sent by the application corresponding to the application process according to a preset location, to generate the confusion instruction.

The above apparatus for securely calling fingerprint information may execute the method for securely calling fingerprint information provided by embodiments of the present disclosure, and includes corresponding functions configured to perform the method, and has beneficial effects.

Figure 6:
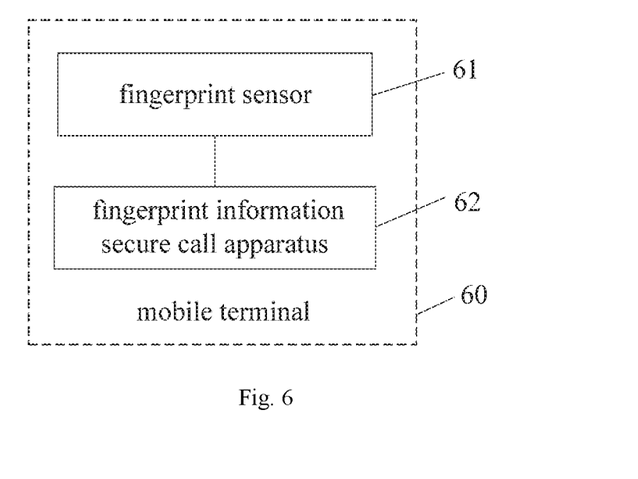
FIG. 6 is a block diagram of a mobile terminal according to a sixth embodiment of the present disclosure.

FIG. 6 is block diagram of a mobile terminal according to a sixth embodiment of the present disclosure.

Referring to FIG. 6, the mobile terminal 60 includes a fingerprint sensor 61 and an apparatus 62 for securely calling fingerprint information coupled to the fingerprint sensor. The apparatus 62 for securely calling fingerprint information includes a request receiving module, a legitimate application determining module and a call allowing module.

The request receiving module is configured to receive a request for calling the fingerprint information.

The legitimate application determining module is configured to determine whether an application corresponding to an application process sending the request for calling the fingerprint information is a legitimate application according to a first unique identification in the application process.

The call allowing module is configured to allow the application corresponding to the application process to call the fingerprint information when it is determined that the application corresponding to the application process is the legitimate application.

In addition, the apparatus further includes a warning message outputting module.

The warning message outputting module is configured to forbid the application corresponding to the application process to call the fingerprint information, and output a warning message when it is determined that the application corresponding to the application process is an illegitimate application.

In addition, the apparatus further includes an identification generating module and an identification storing module.

The identification generating module is configured to generate a second unique identification of the application according to a unique identification public key of the application when installing the application.

The identification storing module is configured to store the second unique identification.

The legitimate application determining module includes an identification matching unit.

The identification matching unit is configured to match the first unique identification in the application process with the second unique identification, and determine that the application corresponding to the application process is the legitimate application when the first unique identification in the application process is matched with the second unique identification successfully.

In addition, the identification storing module is configured to store the second unique identification in an application based on a TrustZone environment. Administrator rights are required to run the application based on the TrustZone environment.

The identification matching unit is configured to access the application based on the TrustZone environment, and match the first unique identification in the application process with the second unique identification stored in the application based on the TrustZone environment.

In addition, the identification matching unit is further configured to: obtain the second unique identification by accessing the application based on the TrustZone environment; determine whether the second unique identification is same as the first unique identification in the application process; determine that the first unique identification in the application process is matched with the second unique identification successfully when the second unique identification is the same as the first unique identification in the application process; and determine that the first unique identification in the application process fails to match with the second unique identification when the second unique identification is different from the first unique identification in the application process.

In addition, the apparatus further includes a confusion instruction generating module.

The confusion instruction generating module is configured to confuse the first unique identification in the application process with an instruction for calling the fingerprint information sent by the application corresponding to the application process, to generate a confusion instruction.

The identification matching unit is configured to extract the first unique identification from the confusion instruction, match the first unique identification with the second unique identification, and allow the application corresponding to the application process to call the fingerprint information when the first unique identification is matched with the second unique identification successfully.

In addition, the mobile terminal provided by embodiments of the present disclosure may further includes a radio frequency (RF) circuit, a memory including one or more computer-readable storage mediums, an input unit, a display unit, a sensor, an audio circuit, a wireless fidelity (WiFi) module, a processor including one or more processing cores, a power supply and other components.

In at least one embodiment, the apparatus 62 for securely calling fingerprint information may be integrated in the processor.

In the embodiment, the mobile terminal including the apparatus for securely calling fingerprint information can determine whether the application corresponding to the application process is the legitimate application according to the unique identification of the application sending the request for call the fingerprint information, and refuse request of the illegitimate application for accessing the fingerprint information. The security level of the fingerprint information is improved, and the security of the user fingerprint information is ensured.

It should be noted that, it would be understood by those skilled in the art that all or a part of the steps carried by the method in the above-described embodiments may be completed by relevant hardware instructed by a program. The program may be stored in a computer readable storage medium such as a memory of a terminal, and be executed by at least one processor in the terminal. When the program is executed, the steps of the fingerprint information secure call method in the above-described embodiments may be included. The storage medium may be a magnetic disk, an optical disk, a read-only memory (ROM), a random access memory (RAM), or the like.

The sequence numbers of the foregoing embodiments of the present disclosure are merely for the purpose of description, and do not represent advantages and disadvantages of the embodiments.

It should be understood by these skilled in the art that, the above modules or steps of the present disclosure may be implemented by common computing devices, which can be centralized on a single computing device or distributed on a network formed by multiple computing devices. Alternatively, they may be implemented by program code executable by a computer device, so that they can be stored in a storage device and executed by the computing device, or may be implemented by making them into individual integrated circuit module respectively, or making multiple modules or steps of them into a single integrated circuit module. In this way, the present disclosure is not limited to any particular combination of hardware and software.

In the specification, the emphasis of each embodiment is on differences from other embodiments, and the same or similar parts between the various embodiments may be referred to each other.

The foregoing descriptions are merely preferred embodiments of the present disclosure, and are not intended to limit the present disclosure. For those skilled in the art, the present disclosure may have various modifications and changes. Any modification, equivalent replacement, improvement and the like made within the spirit and principle of the present disclosure should be included in protection scopes of the present disclosure.

What is claimed is:

1. A method for securely calling fingerprint information, comprising:
    generating a first unique identification of an application corresponding to a unique identification public key of the application when installing the application;
    storing, using a TrustZone application having administrator rights required to access a security zone of a TrustZone environment, the first unique identification in the security zone of the TrustZone environment;
    receiving a request for calling the fingerprint information sent by a requesting application;
    accessing, using the TrustZone application, the security zone of the TrustZone environment to obtain the first unique identification, and matching a second unique identification, received from the requesting application, with the first unique identification, and determining that the requesting application is a legitimate application when the second unique identification is matched with the first unique identification successfully; and
    allowing the requesting application to call the fingerprint information when it is determined that the requesting application is the legitimate application.

2. The method according to claim 1, further comprising:
    when it is determined that the requesting application is an illegitimate application, forbidding the requesting application to call the fingerprint information, and outputting a warning message.

3. The method according to claim 1, wherein, accessing, using the TrustZone application, the security zone of the TrustZone environment to obtain the first unique identification, and matching the second unique identification with the first unique identification comprises:
  obtaining the first unique identification from the security zone of the TrustZone environment;
  determining whether the first unique identification is same as the second unique identification;
  determining that the second unique identification matches the first unique identification successfully when the first unique identification is the same as the second unique identification; and
  determining that the second unique identification fails to match the first unique identification when the first unique identification is different from the second unique identification.

4. The method according to claim 1, further comprising:
  confusing the second unique identification with an instruction for calling the fingerprint information sent by the requesting application, to generate a confusion instruction;
  wherein allowing the requesting application to call the fingerprint information comprises:
  extracting the second unique identification from the confusion instruction, matching the second unique identification with the first unique identification, and allowing the requesting application to call the fingerprint information when the second unique identification is matched with the first unique identification successfully.

5. The method according to claim 4, wherein, confusing the second unique identification with the instruction for calling the fingerprint information sent by the requesting application, to generate the confusion instruction comprises:
  adding the second unique identification to the instruction for calling the fingerprint information sent by the requesting application according to a preset location, to generate the confusion instruction.

6. An apparatus for securely calling fingerprint information, comprising a non-transitory computer-readable medium comprising computer-executable instructions stored thereon, and an instruction execution system which is configured by the instructions to implement at least one of:
  an identification generating module, configured to generate a first unique identification of an application according to a unique identification public key of the application when installing the application;
  an identification storing module, configured to store the first unique identification in a security zone of a TrustZone environment, the identification storing module having administrator rights to access the security zone of the TrustZone environment;
  a request receiving module, configured to receive a request for calling the fingerprint information sent by a requesting application;
  a legitimate application determining module, configured to access the security zone of the TrustZone environment to obtain the first unique identification, and match a second unique identification, received from the requesting application, with the first unique identification, and determine that the requesting application is a legitimate application when the second unique identification is matched with the first unique identification successfully; and
  a call allowing module, configured to allow the requesting application to call the fingerprint information when it is determined that the requesting application is the legitimate application.

7. The apparatus according to claim 6, wherein the instruction execution system is further configured by the instructions to implement:
  a warning message outputting module, configured to forbid the requesting application to call the fingerprint information, and output a warning message when it is determined that the requesting application is an illegitimate application.

8. The apparatus according to claim 6, wherein, the legitimate application determining module is further configured to:
  obtain the first unique identification by accessing the security zone of the TrustZone environment;
  determine whether the first unique identification is same as the second unique identification;
  determine that the second unique identification is matched with the first unique identification successfully when the first unique identification is the same as the second unique identification; and
  determine that the second unique identification fails to match with the first unique identification when the first unique identification is different from the second unique identification.

9. The apparatus according to claim 6, wherein the instruction execution system is further configured by the instructions to implement:
  a confusion instruction generating module, configured to confuse the second unique identification with an instruction for calling the fingerprint information sent by the requesting application, to generate a confusion instruction;
  wherein the legitimate application determining module is configured to:
  extract the second unique identification from the confusion instruction, match the second unique identification with the first unique identification, and allow the requesting application to call the fingerprint information when the second unique identification is matched with the first unique identification successfully.

10. The apparatus according to claim 9, wherein, the confusion instruction generating module is further configured to:
  add the second unique identification to the instruction for calling the fingerprint information sent by the requesting application according to a preset location, to generate the confusion instruction.

11. A mobile terminal, comprising:
  an apparatus for securely calling fingerprint information comprising a non-transitory computer-readable medium comprising computer-executable instructions stored thereon, and an instruction execution system which is configured by the instructions to implement at least one of:
    an identification generating module, configured to generate a first unique identification of an application according to a unique identification public key of the application when installing the application;
    an identification storing module, configured to store the first unique identification in a security zone of a TrustZone environment, the identification storing module having administrator rights to access the TrustZone environment;
    a request receiving module, configured to receive a request for calling the fingerprint information sent by a requesting application;
    a legitimate application determining module, configured to access the security zone of the TrustZone environment to obtain the first unique identification, and match a second unique identification, received from the requesting application, with the first unique identification, and determine that the requesting application is a legitimate application when the second unique identification is matched with the first unique identification successfully; and a call allowing module, configured to allow the requesting application to call the fingerprint information when it is determined that the requesting application is the legitimate application.

12. The terminal according to claim 11, wherein the instruction execution system is further configured by the instructions to implement:

a warning message outputting module, configured to forbid the requesting application to call the fingerprint information, and output a warning message when it is determined that the requesting application is an illegitimate application.

13. The terminal according to claim 11, wherein, the legitimate application determining module is further configured to:

obtain the first unique identification by accessing the security zone of the TrustZone environment;

determine whether the first unique identification is same as the second unique identification;

determine that the second unique identification is matched with the first unique identification successfully when the first unique identification is the same as the second unique identification; and determine that the second unique identification fails to match with the first unique identification when the first unique identification is different from the second unique identification.

14. The terminal according to claim 11, wherein the instruction execution system is further configured by the instructions to implement:

a confusion instruction generating module, configured to confuse the second unique identification with an instruction for calling the fingerprint information sent by the requesting application, to generate a confusion instruction;

wherein the legitimate application determining module is configured to:

extract the second unique identification from the confusion instruction, match second first unique identification with the first unique identification, and allow the requesting application to call the fingerprint information when the second unique identification is matched with the first unique identification successfully.

15. The terminal according to claim 14, wherein, the confusion instruction generating module is further configured to:

add the second unique identification to the instruction for calling the fingerprint information sent by the requesting application according to a preset location, to generate the confusion instruction.

* * * * *